United States Patent
Nakanishi

(10) Patent No.: US 11,536,991 B2
(45) Date of Patent: Dec. 27, 2022

(54) DISPLAY DEVICE

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/302,875

(22) Filed: May 14, 2021

(65) Prior Publication Data

US 2021/0356774 A1 Nov. 18, 2021

(30) Foreign Application Priority Data

May 15, 2020 (JP) .............................. JP2020-085824

(51) Int. Cl.
| | | |
|---|---|---|
| *G02F 1/01* | (2006.01) | |
| *G02F 1/137* | (2006.01) | |
| *G02B 27/01* | (2006.01) | |
| *G02F 1/1335* | (2006.01) | |
| *B60K 35/00* | (2006.01) | |

(52) U.S. Cl.
CPC ............ *G02F 1/0136* (2013.01); *B60K 35/00* (2013.01); *G02B 27/0101* (2013.01); *G02F 1/137* (2013.01); *G02F 1/133504* (2013.01); *G02F 1/133528* (2013.01); *B60K 2370/1529* (2019.05); *G02F 2203/07* (2013.01)

(58) Field of Classification Search
CPC ............ G02F 1/0136; G02F 1/133504; G02F 1/133528; G02F 1/137; G02F 2203/07; B60K 35/00; B60K 2370/1529; G02B 27/0101
See application file for complete search history.

(56) References Cited

U.S. PATENT DOCUMENTS

| | | | |
|---|---|---|---|
| 2018/0164585 A1* | 6/2018 | Nambara | G02B 27/283 |
| 2018/0275483 A1* | 9/2018 | Nakanishi | G02F 1/1347 |
| 2019/0072800 A1* | 3/2019 | Narushima | G02F 1/13362 |
| 2019/0346674 A1* | 11/2019 | Miyake | G02B 26/02 |
| 2019/0346713 A1* | 11/2019 | Miyake | G02F 1/133382 |
| 2020/0116999 A1* | 4/2020 | Watanabe | G02B 5/003 |
| 2020/0201043 A1* | 6/2020 | Sugiyama | G02B 27/0149 |
| 2021/0116707 A1* | 4/2021 | Hirakawa | G02B 26/101 |
| 2021/0208397 A1* | 7/2021 | Lu | G02B 27/0179 |
| 2022/0075189 A1* | 3/2022 | Hirata | G02B 27/01 |

FOREIGN PATENT DOCUMENTS

| | | |
|---|---|---|
| JP | 2018-159857 A | 10/2018 |
| WO | WO 2019/064691 A1 | 4/2019 |

\* cited by examiner

*Primary Examiner* — Ryan Crockett
(74) *Attorney, Agent, or Firm* — Maier & Maier, PLLC

(57) ABSTRACT

According to one embodiment, a display device includes an illumination device, a display panel modulating light from the illumination device and emitting image light, a polarized light modulation element transmitting the image light from the display panel and diffusing external light, and a magnification mirror magnifying an image by the image light transmitted through the polarized light modulation element. The polarized light modulation element is a liquid crystal lens including a first substrate, a second substrate, a liquid crystal layer held between the first substrate and the second substrate, and a first control electrode and a second control electrode applying voltage to the liquid crystal layer.

4 Claims, 6 Drawing Sheets

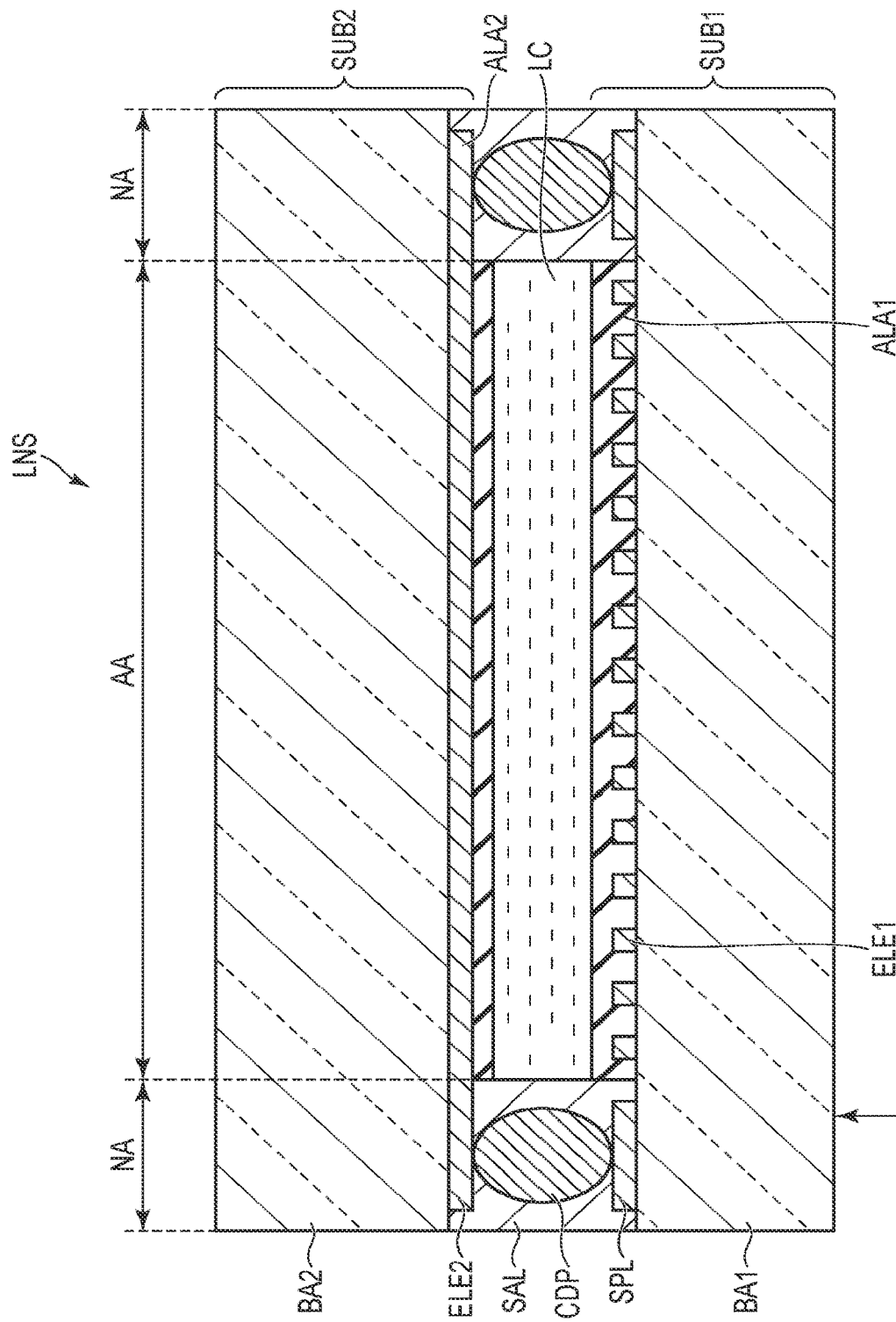
F I G. 4

DISPLAY DEVICE

CROSS-REFERENCE TO RELATED APPLICATIONS

This application is based upon and claims the benefit of priority from Japanese Patent Application No. 2020-085824, filed May 15, 2020, the entire contents of which are incorporated herein by reference.

FIELD

Embodiments described herein relate generally to a display device.

BACKGROUND

As one of display devices, a head-up display (HUD) is developed.

BRIEF DESCRIPTION OF THE DRAWINGS

FIG. 4 is a schematic cross-sectional view of the polarized light modulation element.

DETAILED DESCRIPTION

Figure 1:
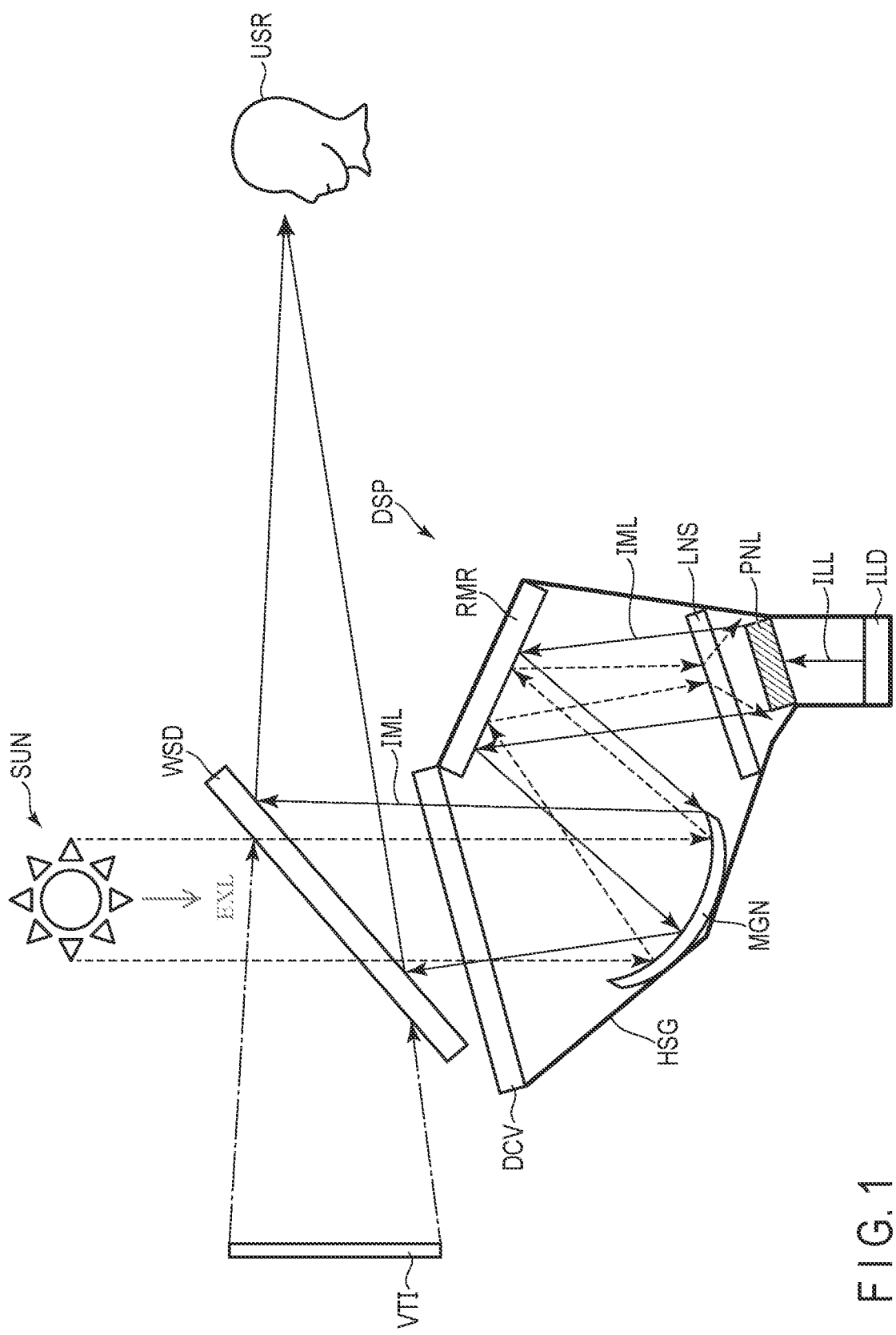
FIG. 1 is an illustration showing the basic configuration of a display device according to one embodiment.

In general, according to one embodiment, there is provided a display device comprising an illumination device, a display panel which modulates light from the illumination device and emits image light, a polarized light modulation element which transmits the image light from the display panel and diffuses external light, and a magnification mirror which magnifies an image by the image light transmitted through the polarized light modulation element.

According to the present embodiment, a display device suppressed in degradation of display quality can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by the same reference numbers, and detailed descriptions thereof are omitted unless necessary.

A display device according to one embodiment will be described hereinafter with reference to the accompanying drawings.

In the present embodiment, a first direction X, a second direction Y and a third direction Z are orthogonal to one another. However, they may intersect one another at an angle other than 90 degrees. A direction toward the tip of an arrow indicating the third direction Z is defined as upward or above, and the opposite direction to the direction toward the tip of the arrow indicating the third direction Z is defined as downward or below.

In addition, when described as the second member above the first member and the second member below the first member, the second member may be in contact with the first member or may be apart from the first member. In the latter case, the third member may be interposed between the first member and the second member. On the other hand, when described as the second member on/over the first member and the second member on/under the first member, the second member is in contact with the first member.

Furthermore, an observation position for observing the display device is assumed to be located on the tip side of the arrow indicating the third direction Z, and viewing from this observation position toward an X-Y plane defined by the first direction X and the second direction Y is referred to as planar view. Viewing a cross section of the display device in an X-Z plane defined by the first direction X and the third direction Z or in a Y-Z plane defined by the second direction Y and the third direction Z is referred to as cross-sectional view.

Embodiment

FIG. 1 is an illustration showing the basic configuration of the display device of the embodiment, and it is a display device for projecting an image mainly on a vehicle windshield WSD, that is, a vehicle display device. More specifically, the display device of the embodiment is, for example, a vehicle head-up display.

The display device DSP shown in FIG. 1 comprises an illumination device ILD, a display panel PNL, a polarized light modulation element LNS, a magnification mirror MGN, a reflection mirror RMR, a cover member DCV and a housing HSG. The housing HSG is an accommodation for accommodating the illumination device ILD, the display panel PNL, the polarized light modulation element LNS, the magnification mirror MGN, the reflection mirror RMR and the cover member DCV therein. The illumination device ILD comprises a plurality of light source elements, and illuminates the display panel PNL. Light emitted from the illumination device ILD is referred to as illumination light ILL. The illumination light ILL is emitted to the display panel PNL.

The display panel PNL is a transmissive or reflective liquid crystal display panel. Light emitted from the display panel PNL is referred to as image light IML. The display panel PNL can be referred to also as an optical modulation element which modulates the illumination light ILL from the illumination device ILD and emits the image light IML. In the example shown in FIG. 1, the display panel PNL is a transmissive liquid crystal display panel.

Figure 6:
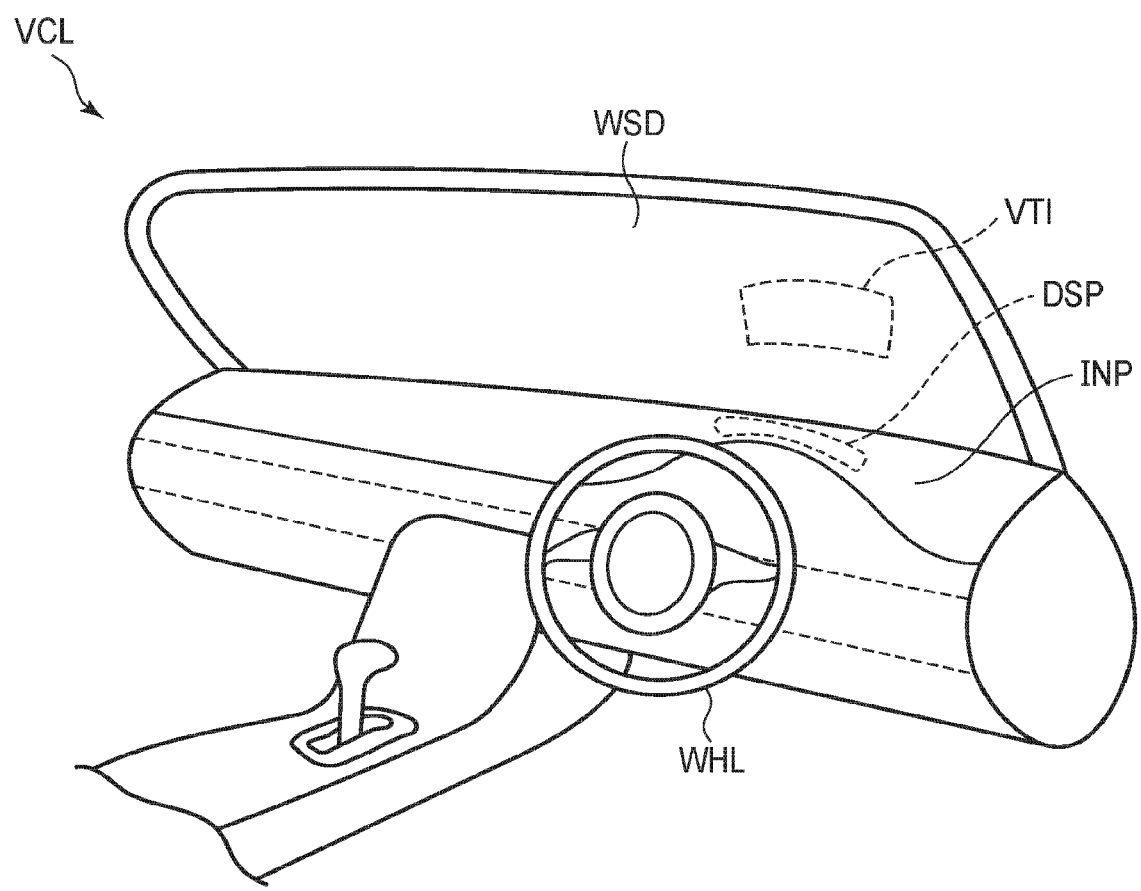
FIG. 6 is an illustration showing the display device installed in a vehicle.

As described above, when an image is projected on the vehicle windshield WSD by the display device DSP, as shown in FIG. 6, the display device DSP needs to be installed in a vehicle VCL.

FIG. 6 is an illustration showing the display device installed in the vehicle. The display device DSP is installed on an installment panel INP of the vehicle VCL. As will be described later in detail, the display device DSP projects a virtual image VTI on the windshield of the vehicle VCL. In FIG. 6, the display device DSP is installed in front of a driver seat where a handle WHL is located.

When the display panel PNL is a transmissive display panel, the illumination device ILD is disposed on the rear side of the display panel PNL. On the other hand, when the display panel PNL is a reflective display panel, the display panel PNL displays an image by selectively reflecting the illumination light ILL from the illumination device ILD. In this case, the illumination device ILD is disposed on the front side of the display panel PNL.

The description will be continued with reference to FIG. 1 again. The polarized light modulation element LNS is an element which transmits the first polarized light and diffuses the second polarized light. The first polarized light and the second polarized light have vibration planes orthogonal to each other. As the polarized light modulation element LNS, for example, a liquid crystal lens or a fixed lens having anisotropy is used. The polarized light modulation element LNS will be described later in detail.

The reflection mirror RMR and the magnification mirror MGM each are a member which reflects the image light IML emitted from the display panel PNL and transmitted through the polarized light modulation element LNS toward the cover member DCV. The reflection mirror RMR changes the angle of the incident image light IML while emitting it. The magnification mirror MGN changes the angle of the incident image light IML and increases the width of the incident light while emitting it. The magnification mirror MGN is, for example, a concave mirror having a concave surface.

The cover member DCV is disposed on the upper surface of the housing HSG. The cover member DCV functions as the exit for the image light IML in the display device DSP. The cover member DCV is formed of a member which transmits visible light, and emits the image light IML to the windshield WSD (referred to also as a windscreen). The cover member DCV also has a function of preventing the entry of dirt or dust to the housing HSG.

The image light IML emitted from the display device DSP is projected on the windshield WSD of the vehicle. A user USR who uses the display device DSP can visually recognize the virtual image VTI in front of the windshield WSD. In the example shown in FIG. 1, the windshield WSD is taken as an example of a member on which the image light IML is projected. However, it is not limited to this. Another member such as a combiner may be used instead of the windshield WSD.

In FIG. 1, the illumination light ILL and the image light IMM are shown by solid lines, and a light path from the virtual image VTI to the windshield WSD for the sake of convenience is shown by a dashed-dotted line.

Figure 2:
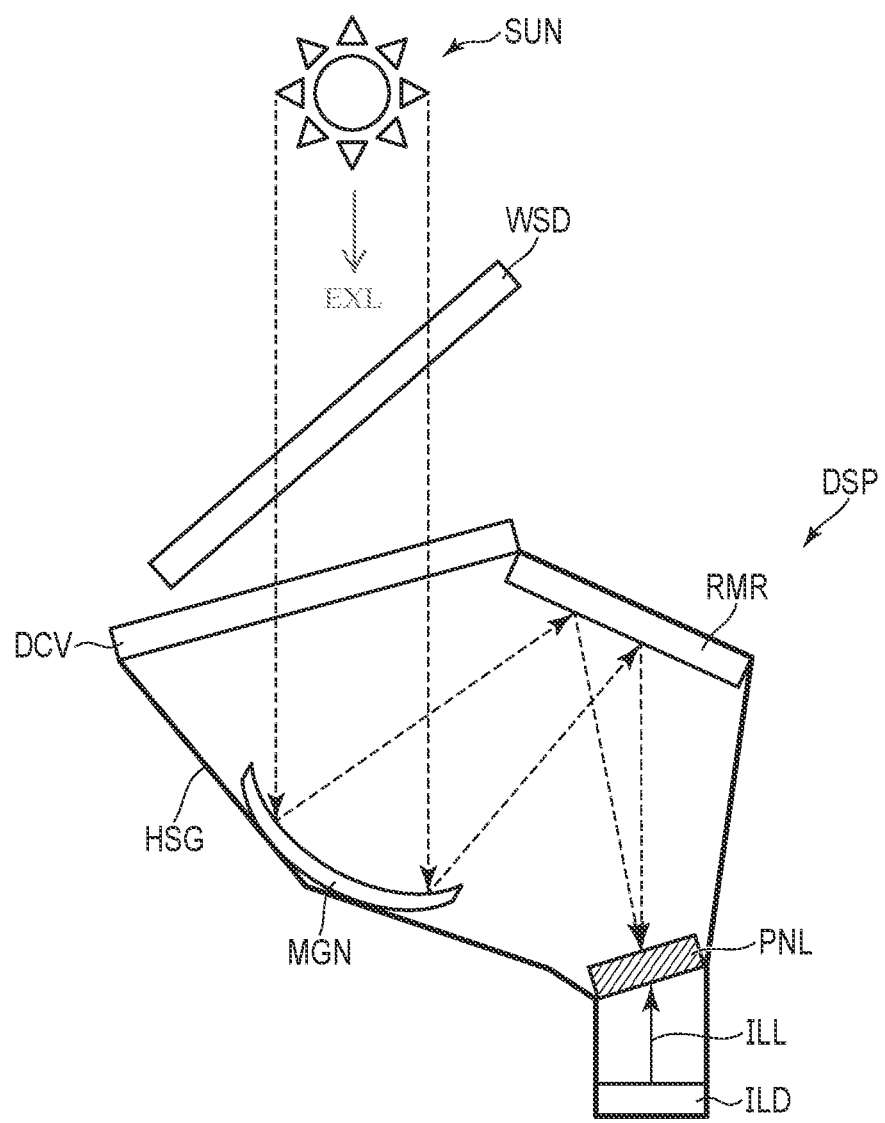
FIG. 2 is an illustration showing a display device comprising no polarized light modulation element.

Here, the influence of external light EXL from the sun SUN in the display device DSP comprising no polarized light modulation element LNS will be described. FIG. 2 is an illustration showing a display device comprising no polarized light modulation element. In the display device DSP shown in FIG. 2, the external light EXL from the sun SUN is transmitted through the windshield WSD, and enters the inside of the display device DSP from the cover member DCV which is the exit for the emitted light of the display device DSP. In FIG. 2, the external light EXL is shown by a dotted line.

The external light EXL entering the inside of the display device DSP is transmitted through the cover member DCV, and is reflected and converged by the magnification mirror MGN. The converged external light EXL is reflected by the reflection mirror RMR, and is radiated to the display panel PNL.

The converged external light EXL and the illumination light ILL from the illumination device ILD described with reference to FIG. 1 are radiated to the display panel PNL. Accordingly, the temperature of the display panel PNL increases. When the display panel PNL is a liquid crystal display panel, as the temperature increases, the liquid crystal layer may make a phase transition to an isotropic body. This may cause display abnormalities in the display panel PNL.

In the present embodiment, it is possible to suppress the temperature increase of the display panel PNL by disposing the polarized light modulation element LNS which diffuses light other than the image light IML, specifically, the external light EXL between the display panel PNL and the magnification mirror MGN. Since the polarized light modulation element LNS is disposed, the external light EXL from the sun SUN is diffused without being converged on the display panel PNL.

The polarized light modulation element LNS will be described with reference to FIG. 1 again. In FIG. 1, a liquid crystal lens is taken as an example of the polarized light modulation element LNS. The polarized light modulation element LNS is disposed between the display panel PNL and the magnification mirror MGN as described above, more specifically, between the display panel PNL and the reflection mirror RMR. The polarized light modulation element LNS should preferably be disposed at a position close to the display panel PNL because the size of the polarized light modulation element LNS can be reduced. However, if the polarized light modulation element LNS is disposed at a position too close to the display panel PNL, the polarized light modulation element LNS may not diffuse light sufficiently. Therefore, the distance between the polarized light modulation element LNS and the display panel PNL may be arbitrarily determined in consideration of the diffusion capacity of the polarized light modulation element LNS and the magnification rate of the magnification mirror MGN.

In the display device DSP shown in FIG. 1, the external light EXL (dotted line) from the sun SUN is the same as FIG. 2 until it reaches the polarized light modulation element LNS. In the display device DSP shown in FIG. 1, predetermined polarized light of the external light EXL is diffused by the polarized light modulation element LNS. Therefore, the amount of the external light EXL reaching the display panel PNL becomes smaller than the amount of the external light EXL in FIG. 2. Consequently, the temperature increase due to the convergence of the external light EXL is suppressed, and the phase transition of the liquid crystal layer of the display panel PNL can be suppressed. Accordingly, the display device DSP suppressed in degradation of display quality can be obtained.

Figure 3:
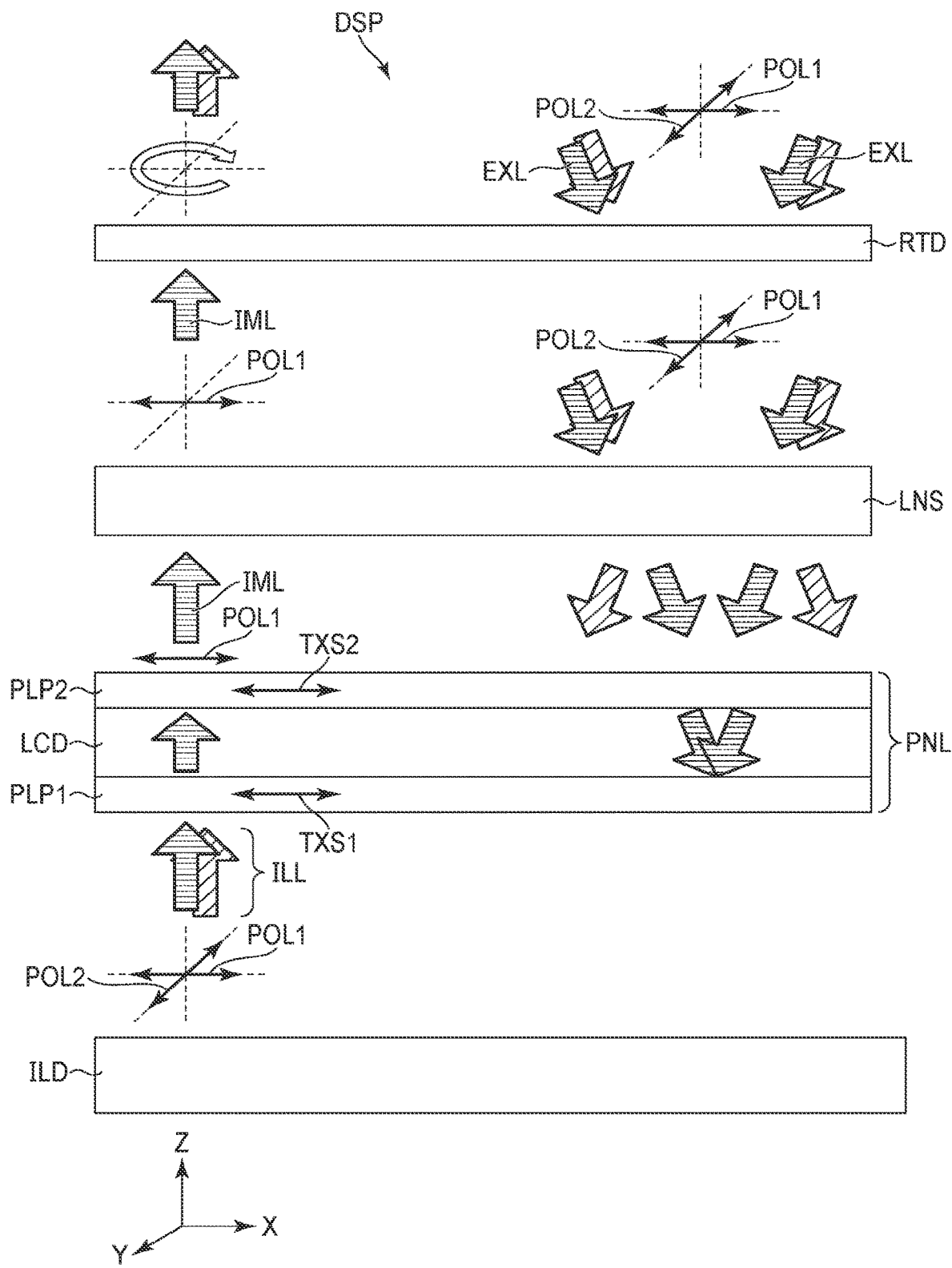
FIG. 3 is an illustration for explaining the effect of the polarized light modulation element in the display device.

FIG. 3 is an illustration for explaining the effect of the polarized light modulation element in the display device. In FIG. 3, when the traveling direction of light is long the third direction Z, linearly polarized light having a vibration plane along the first direction X is referred to as first polarized light POL1, and linearly polarized light having a vibration plane along the second direction Y is referred to as second polarized light POL2. In FIG. 3, the first polarized light POL1 is shown by an arrow having a horizontal stripe pattern in the drawing, and the second polarized light POL2 is shown by an arrow having a diagonal stripe pattern in the drawing.

First, the illumination light ILL and the image light IML will be described. As shown in FIG. 3, the illumination light ILL emitted from the illumination device ILD includes the first polarized light POL1 and the second polarized light POL2. The illumination light ILL including the first polarized light POL1 and the second polarized light POL2 enters the display panel PNL.

The display panel PNL has a polarizer PLP1 and a polarizer PLP2, and a liquid crystal panel LCD disposed between the polarizer PLP1 and the polarizer PLP2.

The polarizer PLP1 of the display panel PNL has a transmission axis TXS1 for transmitting the second polarized light POL2. In addition, the polarizer PLP2 has a transmission axis TXS2 for transmitting the first polarized light POL1. Accordingly, only the first polarized light POL1 is transmitted through the display panel PNL, and the second polarized light POL2 is blocked by the display panel PNL.

The polarized light modulation element LNS is controlled to transmit only the first polarized light POL1. Therefore, the image light IML emitted from the display panel PNL is transmitted through the polarized light modulation element LNS.

A retarder RTD is disposed on the polarized light modulation element LNS. In the example shown in FIG. 3, a ¼λ plate is used as the retarder RTD. Here, λ is the wavelength of incident light. Accordingly, the image light IML entering the retarder RTD is emitted with a circularly polarized light component.

Next, the external light EXL will be described. The external light EXL includes random polarized light and also includes the first polarized light POL1 and the second polarized light POL2 described above. The external light EXL enters the retarder RTD first, and passes through the retarder RTD while including the first polarized light POL1 and the second polarized light POL2. The external light EXL transmitted through the retarder RTD enters the polarized light modulation element LNS.

Here, the specific configuration of the polarized light modulation element LNS will be described. FIG. 4 is a schematic cross-sectional view of the polarized light modulation element LNS. The polarized light modulation element LNS comprises a first substrate SUB1, a second substrate SUB2, a liquid crystal layer LC formed of liquid crystal molecules, first control electrodes ELE1, and a second control electrode ELE2. In the illustrated example, the first control electrodes ELE1 are disposed in the first substrate SUB1, and the second control electrode ELE2 is disposed in the second substrate SUB2. However, both the first control electrodes ELE1 and the second control electrode ELE2 may be disposed in the same substrate, that is, in the first substrate SUB1 or the second substrate SUB2.

The first substrate SUB1 comprises a base BA1 having optical transparency, the first control electrodes ELE1, an alignment film ALA1 and a power supply line SPL. The first control electrodes ELE1 are located between the base BA1 and the liquid crystal layer LC. The first control electrodes ELE1 are arranged at intervals in the first direction X. In one example, the width along the first direction X of the first control electrode ELE1 is less than or equal to the gap along the first direction X between the adjacent first control electrodes ELE1. The alignment film ALA1 covers the first control electrodes ELE1, and is in contact with the liquid crystal layer LC. The power supply line SPL is located in a non-effective area NA outside an effective area AA.

The second substrate SUB2 comprises a base BA2 having optical transparency, the second control electrode ELE2, and an alignment film ALA2. The second control electrode ELE2 is located between the base BA2 and the liquid crystal layer LC. The second control electrode ELE2 is, for example, a single plate electrode located over substantially the entire surface of the effective area AA and also extending in the non-effective area NA. The second control electrode ELE2 is opposed to the first control electrodes ELE1 via the liquid crystal layer LC in the effective area AA. The second control electrode ELE2 is opposed to the power supply line SPL in the non-effective area NA. The alignment film ALA2 covers the second control electrode ELE2, and is in contact with the liquid crystal layer LC.

The bases BA1 and BA2 each are, for example, a glass substrate or a resin substrate. The first control electrodes ELE1 and the second control electrode ELE2 are formed of a transparent conductive material such as indium tin oxide (ITO) or indium zinc oxide (IZO). The alignment films ALA1 and ALA2 each are, for example, a horizontal alignment film, and both are subjected to alignment treatment along the first direction X.

The first substrate SUB1 and the second substrate SUB2 are bonded together by a sealing material SAL in the non-effective area NA. The sealing material SAL comprises a conductive material CDP. The conductive material CDP is interposed between the power supply line SPL and the second control electrode ELE2, and electrically connects the power supply line SPL and the second control electrode ELE2.

The liquid crystal layer LC is held between the first substrate SUB1 and the second substrate SUB2. The liquid crystal layer LC is formed of, for example, a liquid crystal material having a positive dielectric anisotropy. The first control electrodes ELE1 and the second control electrode ELE2 change the alignment direction of liquid crystal molecules LCM contained in the liquid crystal layer LC by applying voltage to the liquid crystal layer LC.

In the present embodiment, the polarized light modulation element LNS functions as a liquid crystal lens. In addition, as will be described later, the polarized light modulation element LNS can be referred to also as an anisotropic scattering element using the birefringence of the liquid crystal layer LC.

A controller ICT controls voltage applied to the liquid crystal layer LC. The controller ICT can control the degree of change of the alignment direction of the liquid crystal molecules LCM contained in the liquid crystal layer LC by controlling voltage supplied to each of the first control electrodes ELE1 and the second control electrode ELE2. In the present embodiment, the degree of change of the alignment direction of the liquid crystal molecules LCM corresponds to the degree of scattering by the liquid crystal layer LC.

Figure 5:
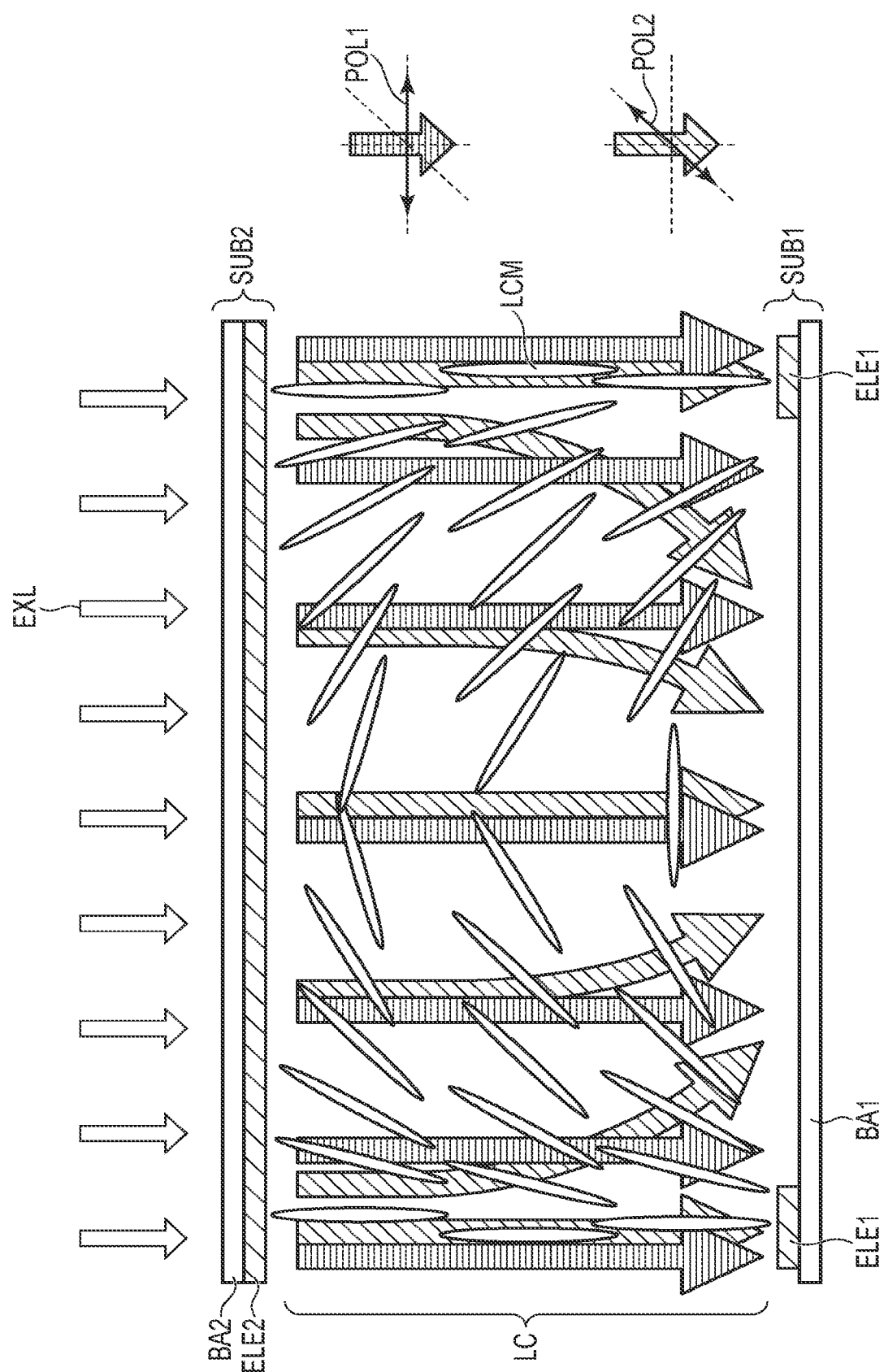
FIG. 5 is an illustration for explaining the effect of the polarized light modulation element shown in FIG. 4.

FIG. 5 is an illustration for explaining the effect of the polarized light modulation element LNS shown in FIG. 4. In FIG. 5, similarly to FIG. 3, the first polarized light POL1 is shown by an arrow having a horizontal stripe pattern in the drawing, and the second polarized light POL2 is shown by an arrow having a diagonal stripe pattern in the drawing.

The polarized light modulation element LNS have different effects on the first polarized light POL1 and the second polarized light POL2. That is, the polarized light modulation element LNS transmits the first polarized light POL1 of the external light EXL almost without refracting it, and refracts the second polarized light POL2 of the external light EXL. As described above, the polarized light modulation element LNS has anisotropy with respect to light to be transmitted.

When voltage is applied to the first control electrodes ELE1 and the second control electrode ELE2 of the polarized light modulation element LNS, an electric field along the third direction Z is formed. The liquid crystal molecules LCM are aligned such that the major axes thereof are along the third direction Z. In an area between the two adjacent first control electrodes ELE1, an electric field inclined with respect to the third direction Z is formed, and the liquid crystal molecules LCM are aligned such that the major axes thereof are inclined with respect to the third direction Z accordingly.

On the other hand, in a middle area between the two adjacent first control electrodes ELE1, almost no electric field is formed or an electric field along the first direction X is formed, and the liquid crystal molecules LCM are aligned such that the major axes thereof are along the first direction X accordingly.

The liquid crystal molecules LCM have a refractive anisotropy $\Delta n$. Therefore, the liquid crystal layer LC has a refractive index distribution corresponding to the alignment state of the liquid crystal molecules LCM. Alternatively, the liquid crystal layer LC has a retardation distribution or a phase distribution represented as $\Delta n \cdot d$ where d is the thickness along the third direction Z of the liquid crystal layer LC.

In the example shown in FIG. 5, the polarized light modulation element LNS is a liquid crystal lens functioning as a convex lens. However, it is possible to diffuse the light emitted from the liquid crystal lens (the second polarized light POL2 in FIG. 5) by disposing the display panel PNL at a distance shorter than the focal length of the liquid crystal lens (the polarized light modulation element LNS). Accordingly, the second polarized light POL2 emitted from the polarized light modulation element LNS is diffused and does not reach the display panel PNL. Therefore, the temperature increase of the display panel PNL can be suppressed.

The first polarized light POL1 transmitted through the polarized light modulation element LNS will be described with reference to FIG. 3 again. As described in FIG. 2, the external light EXL is converged by the magnification mirror MGN. The first polarized light POL1 included in the external light EXL is radiated to the display panel PNL in a converged state. However, the second polarized light POL2 of the external light EXL is diffused by the polarized light modulation element LNS. Therefore, the overall amount of the external light EXL becomes smaller than that when no polarized light modulation element LNS is disposed. Consequently, even when the first polarized light POL1 is converged on the display panel PNL, the temperature increase of the display panel PNL can still be suppressed.

In the present embodiment, the polarized light modulation element LNS is an anisotropic diffusing element which transmits the first polarized light POL1 and diffuses the second polarized light POL2. In the present embodiment, a case where a liquid crystal lens is used as the anisotropic diffusing element is described. However, it is not limited to this. A fixed lens having anisotropy may be used as the polarized light modulation element LNS. An example of the fixed lens is a resin lens containing a material having anisotropic diffusibility.

According to the present embodiment, the temperature increase of the display panel PNL due to the external light EXL can be suppressed in the display device DSP. Therefore, the phase transition of the liquid crystal layer of the display panel PNL can be suppressed. Consequently, the display device DSP suppressed in degradation of display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   an illumination device;
   a display panel which modulates light from the illumination device and emits image light;
   a polarized light modulation element which transmits the image light from the display panel and diffuses external light;
   a retarder disposed on the polarized light modulation element; and
   a magnification mirror which magnifies an image by the image light transmitted through the polarized light modulation element, wherein
   the polarized light modulation element is a liquid crystal lens,
   the polarized light modulation element comprises a first substrate, a second substrate, a liquid crystal layer held between the first substrate and the second substrate, and a first control electrode and a second control electrode which apply voltage to the liquid crystal layer,
   the polarized light modulation element transmits first polarized light and diffuses second polarized light,
   the first polarized light is linearly polarized light having a vibration plane along a first direction, and the second polarized light is linearly polarized light having a vibration plane along a second direction orthogonal to the first direction,
   the first polarized light is equivalent to a polarized light emitted from the display panel,
   the first substrate and the second substrate are parallel with a display area of the display panel on which an image is displayed,
   the display area of the display panel is oblique to the illumination device, and
   the retarder is parallel with the first substrate or the second substrate of the polarized light modulation element.

2. The display device according to claim 1, wherein the display panel is a liquid crystal display panel.

3. The display device according to claim 2, wherein the liquid crystal display panel is a transmissive liquid crystal display panel or a reflective liquid crystal display panel.

4. The display device according to claim 1, further comprising a vehicle windshield, wherein
   the display device is a head-up display which projects an image on the vehicle windshield.

* * * * *